Figure 1:
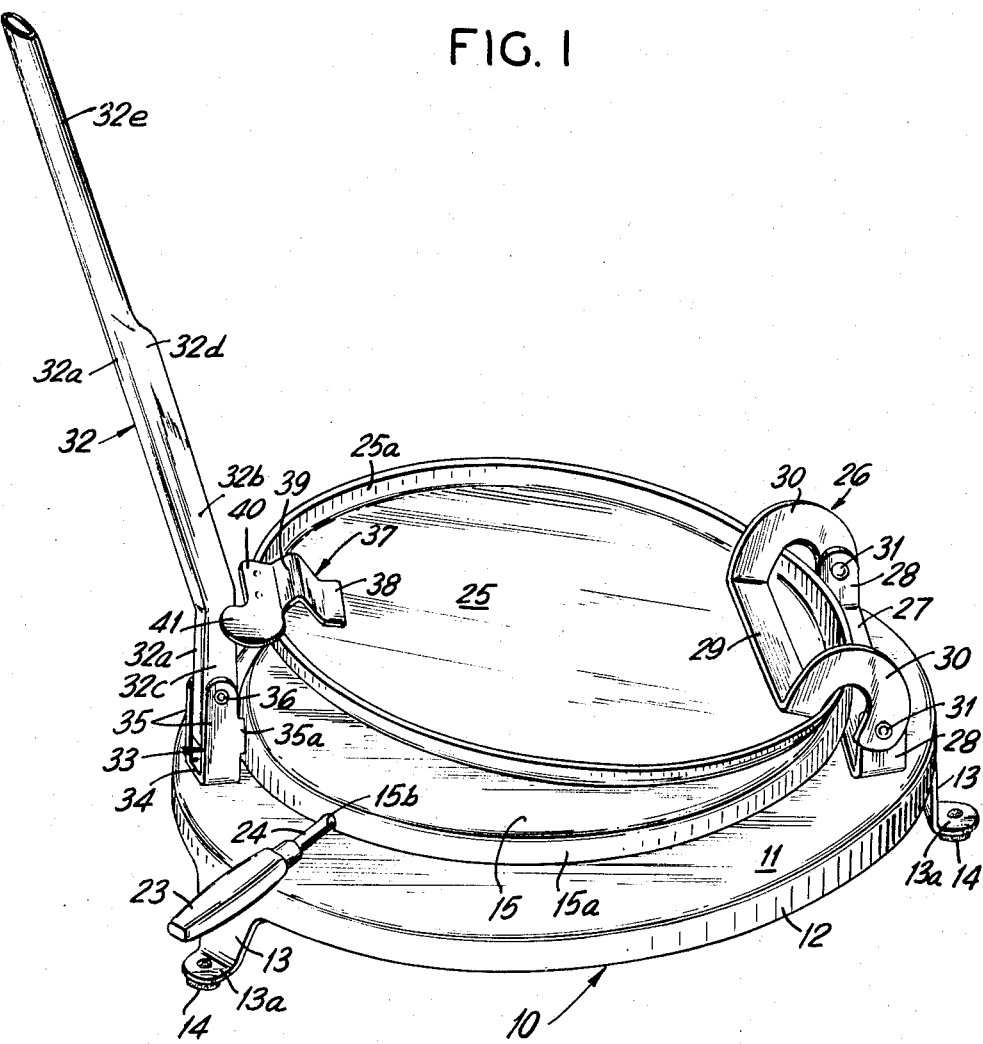

Nov. 14, 1967  M. R. LASSAULX  3,352,258
MACHINE FOR MAKING TORTILLAS AND THE LIKE
Filed Sept. 8, 1965  3 Sheets-Sheet 1

INVENTOR.
MANUEL ROCHA LASSAULX

ATTORNEYS.

INVENTOR.
MANUEL ROCHA LASSAULX

Nov. 14, 1967   M. R. LASSAULX   3,352,258
MACHINE FOR MAKING TORTILLAS AND THE LIKE
Filed Sept. 8, 1965   3 Sheets-Sheet 3

INVENTOR.
MANUEL ROCHA LASSAULX

ATTORNEYS.

United States Patent Office 3,352,258
Patented Nov. 14, 1967

3,352,258
MACHINE FOR MAKING TORTILLAS
AND THE LIKE
Manuel R. Lassaulx, 244 Ejercito Nacional Ave.,
Mexico City, Mexico
Filed Sept. 8, 1965, Ser. No. 485,763
9 Claims. (Cl. 107—15)

This invention relates to an improved machine for making tortillas. While the invention is applicable to the making of cornmeal tortillas, the invention is particularly applicable to the making of wheat flour tortillas, because of particular problems inherent in the processing of tortilla dough made with wheat flour.

Tortillas are commonly made by making balls of dough, according to an appropriate recipe, and then rolling the balls of dough out flat upon a flat surface, by means of a roller. However, this rolling method is unsatisfactory in the case of tortillas made with wheat flour, because of the resiliency and springiness of the dough.

In many areas of the world, it is of extreme importance to encourage the use of wheat flour in the making of tortillas, and accordingly it is a particular object of this invention to provide inexpensive, durable, easily operated apparatus for processing the ball of tortilla dough, made from wheat flour, into the desired extremely thin, flat cakes.

In a representative recipe, a dough for wheat tortillas may be formed from the following ingredients:

| | | |
|---|---|---|
| Wheat flour | ounces | 56 |
| Animal or vegetable lard | do | 15½ |
| Salt | teaspoons | 3 |
| Baking powder | do | 1 |
| Warm water or milk | ounces | 11½ |

The wheat flour is sifted and mixed with the salt and baking powder. The resulting mixture is then mixed with the lard, using the fingers to avoid the formation of lumps. The water or milk is then added while kneading the dough. A small ball is then taken from the resulting dough and such ball of dough is pressed flat with a rolling pin until the thin tortilla cake is obtained. This cake is then baked in the usual way. However, the rolling process, with a mix of this type is exeremely difficult. Another problem with the use of a roller is the difficulty in obtaining the desired round tortilla cakes. It is, furthermore, not possible to make the wheat tortillas simply by pressing the dough, because of the resiliency and springiness of the dough.

In accordance with the invention, there is provided apparatus essentially made of metal, of simple and rugged construction, and having parts controlled by two handles which can be very easily simultaneously manipulated with the respective hands of the operator in order quickly to flatten balls of dough to cakes of uniform thickness.

In accordance with the invention, the apparatus includes a base and a flat disk mounted on the base so that the disk can be oscillated about a vertical axis. One of the handles is attached to the disk. The apparatus also comprises a flat-bottomed cover which is pivotally mounted upon the base independently of the mounting of the disk. The ball of dough may be placed upon the disk under the cover, and the cover may be manually pressed downwardly toward the disk by any suitable means including a second handle. Accordingly, by simultaneous manipulation of the two handles, the ball of dough may be simultaneously pressed between the cover and the disk and operated so as to be rapidly flattened into a round cake.

The apparatus includes a number of other features so as to facilitate the convenience of its use. Thus, stop means are provided so as to limit the downward movement of the cover to a position in which it is parallel to the disk. Additionally, the vertical position of the disk may be adjusted. In this way, tortilla cakes of uniform selected thickness can be obtained. Additionally, the means for manipulating the cover are designed for simplicity, but at the same time for adequate mechanical advantage so that the desired pressure upon the ball of dough can be obtained without undue exertion by the operator. Furthermore, because of the tendency of the dough to stick to the metal, plastic sheets are provided which can be used to face the opposing surfaces of the cover and disk. There is much less tendency for the dough to stick to the resulting plastic surfaces, so that it is readily changed from ball form to cake form. In addition, the plastic sheets are advantageously made removable so as to facilitate cleaning of the apparatus.

Other objects and advantages of the invention will become apparent from the following description, in conjunction with the annexed drawings, which are substantially to scale of a working model of the apparatus. The drawings are a part of this disclosure.

In the drawings,

FIG. 1 is a perspective view of the apparatus showing the cover slightly raised and the actuating handle for the cover raised, this being the condition of the apparatus when a ball of tortilla dough is placed upon the disk with the cover resting upon the ball.

Figure 2:
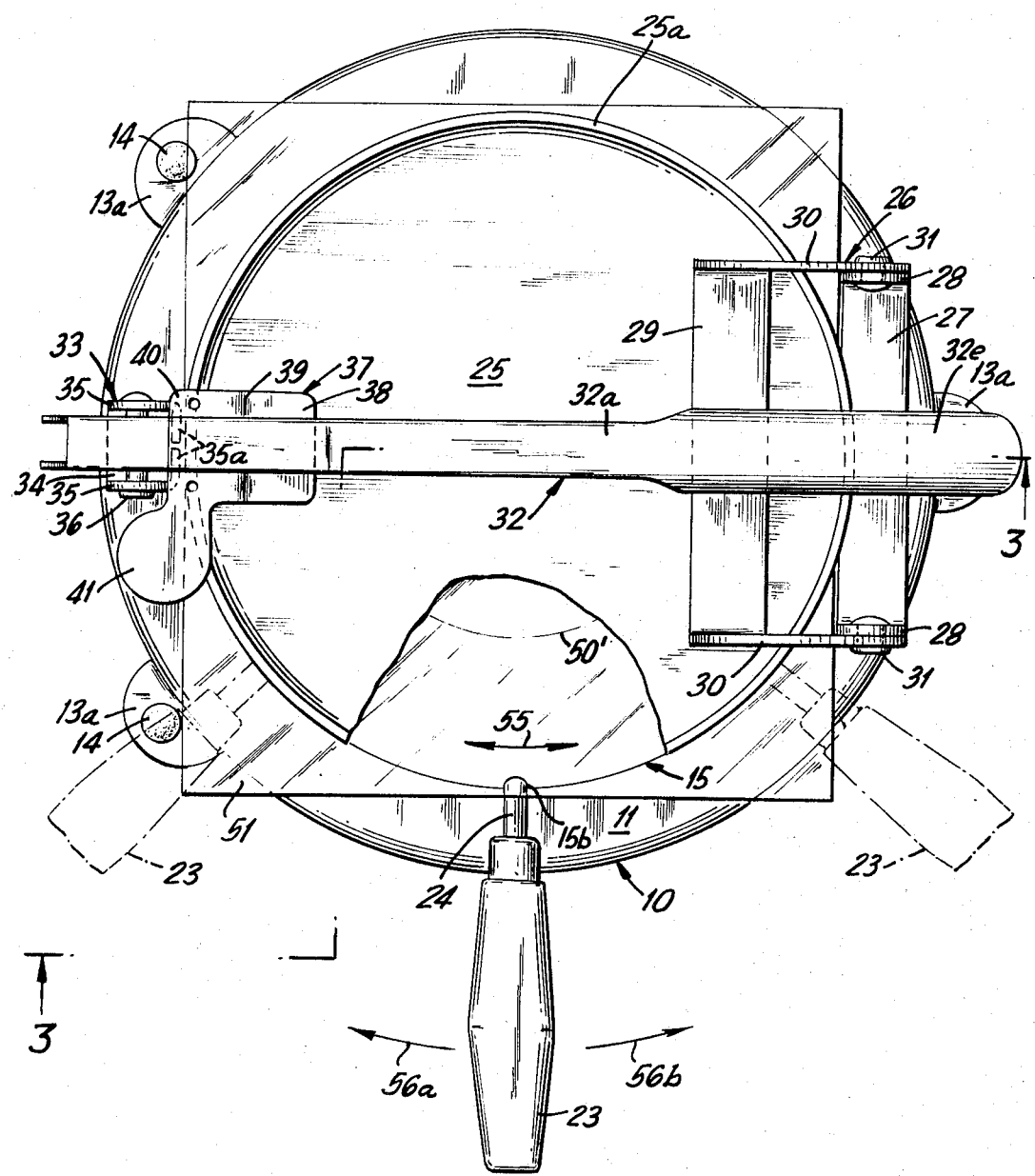

FIG. 2 is a top plan view of the apparatus, partly broken away. FIG. 2 shows the handle associated with the cover in operating position wherein it exerts a downward force upon the cover. FIG. 2 also shows the disk and associated handle in a full line intermediate position and in broken lines in two further positions representative of oscillatory movements of the disk between two selected extreme positions.

Figure 3:
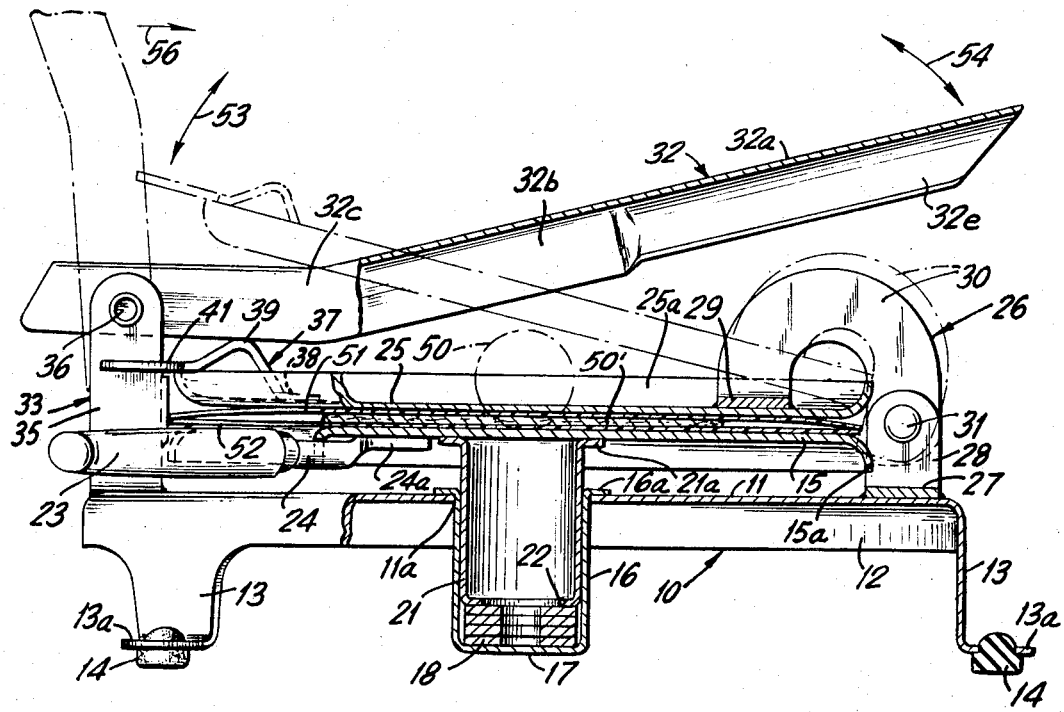

FIG. 3 is a section on lines 3—3 of FIG. 2. In the full line showing of FIG. 3, the apparatus is shown in final position wherein the ball of dough has been pressed and flattened into a cake. FIG. 3 shows the cover and its operating handle in raised position in broken lines and further shows in broken lines the ball of dough as it appears resting upon the disk with the cover raised.

Figure 4:
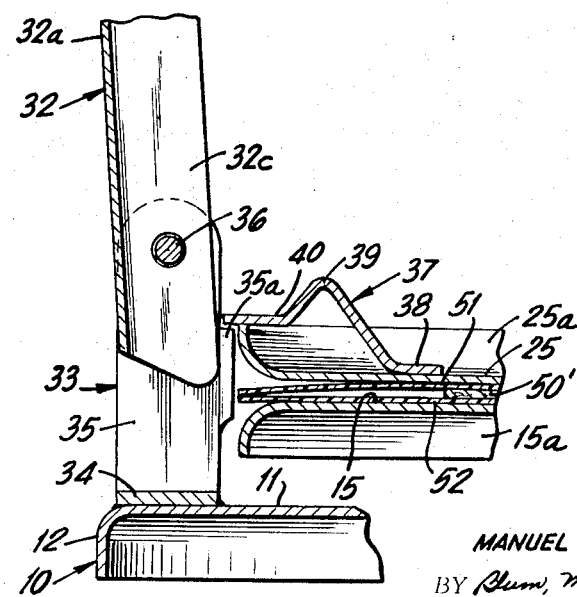

FIG. 4 is a fragmentary detail view similar to FIG. 3, but showing the cover operating handle raised.

Upon reference to the drawings in detail, it will be noted that they show a base 10 made of metal and having a flat circular top 11 which has a depending cylindrical peripheral flange 12. A plurality of feet 13 depend from flange 12, each foot 13 having an outwardly extending bottom flange 13a which receives a resilient pad 14 on its lower face.

In order to support disk 15, the top 11 of face 10 is provided with a central opening 11a which receives socket 16. Socket 16 is cylindrical with a bottom closure 17 and extends through the opening 11a. The socket 16 is provided at its upper end with an outwardly extending flange 16a which rests upon the top 11. A plurality of washers 18 are removably received within the socket 16 resting upon its bottom closure 17, the number of washers being chosen according to the desired height of disk 15.

The metal disk 15 is flat with a depending peripheral cylindrical flange 15a. Preferably the diameter of disk 15 is less than the diameter of base 10. Disk 15 is supported by a cylindrical spindle 21. The upper end of spindle 21 is provided with an outwardly extending peripheral flange 21a which is fixed to the lower surface of disk 15. The lower end of spindle 21 is provided with a bottom closure 22, and the spindle 21 is turnably received within the socket 16 with closure 22 resting upon the uppermost washer 18. Accordingly, disk 15 is supported above base 10 by a distance corresponding to the number of washers 18 which are used, and disk 15 is turnable about the axis of spindle 21, such axis being transverse to the base 10.

A radially extending handle 23 is secured to a shaft 24 with shaft 24 extending through a notch 15b in flange 15a and having an extension 24a which is connected to the under side of disk 15. Accordingly, the operator can grasp the externally accessible handle 23 and oscillate disk 15.

The metal cover 25 is flat and of substantially the same area as disk 15. Cover 25 is provided with an upstanding peripheral cylindrical flange 25a, also for strengthening purposes. Cover 25 is secured at one side thereof to base 11 by means of hinge 26, the mounting means for the cover being thereby independent of the mounting means for the disk. Hinge 26 includes a strip 27 fixed to base top 11 outwardly of disk 15 by any suitable means. Parallel ears 28 are upstanding from strip 27 at the ends thereof. A further strip 29 is fixed to the top of cover 25. Parallel ears 30 connect upstandingly with the ends of strip 29. These ears 30 extend upwardly over the top of the flange 25a, then extend outwardly and finally extend downwardly outside and adjacent the ears 28, the exact shape of ears 30 being clear from the drawing. The ears 30 are respectively connected to the ears 28 by means of aligned pivots 31 so that the cover 25 may be pivoted relative to base 10 around the horizontal axis of the pivots 31. It will be apparent, therefore, that the cover 25 may be pivoted away from the disk 15 and also towards the disk into substantial registration therewith.

In addition to the aforesaid disk handle 23, for manipulation by one hand of the operator, there is provided a cover handle 32, for manipulation by the other hand of the operator, to control the position of cover 25. Handle 32 has parallel walls 32b and a connecting wall 32a. These walls merge into a tubular handle free end portion 32e. The handle 32 is bent near its connected end so that when the handle portion 32c between the bend and the connected portion of the handle is vertical, as shown in FIG. 1, the other handle portion 32d is upwardly outwardly inclined. The handle portion 32c is connected to base top 11, outwardly of disk 15 and at a point diametrically opposed to the hinge 26, by means of a further hinge 33. This hinge 33 has a base portion 34 which is fixed to the base top 11 and upstanding parallel ears 35. The handle portion 32c extends between the ears 35 and the walls 32b are connected respectively to the ears 35 by means of a pivot 36. The axis of pin 36 is horizontal and is parallel to the common axis of the pivots 31.

In order to facilitate the interengagements of handle 32 and cover 25, as well as to facilitate the provision of stop means for the cover, a cam element 37 is fixed to cover 25 adjacent to the handle 32 in the closed position of cover 25. This element 37 is made of metal and includes a flat end portion 38 which is affixed by any suitable means to the top of cover 25. The end portion 38 connects with an intermediate upwardly arched cam portion 39, which connects at its outer end with a flat flange 40. The cam portion 39 is shaped so that the flange 40 rests upon and extends outwardly of the upper edge of flange 25a. One side of the flange 40 is enlarged and extended, as clearly shown in FIG. 1, to provide a finger piece 41 to facilitate manipulation of the cover, in the handle position shown in FIG. 1, for raising and lowering of the cover.

In the use of the apparatus, tortilla dough is prepared, for example, by the recipe given above. A ball 50 of such dough, shown diagrammatically in broken lines in FIG. 3, is shaped by the apparatus, in conjunction with two sheets of strong but pliant plastic 51 and 52. These sheets 51 and 52 may be square and may be made of polyethylene, polyvinylchloride or other suitable material which is resistant to tearing and to which the tortilla dough adheres or sticks less readily than to the metal of the cover 25 and disk 15. The sheets may be square and slightly wider than the dish and cover diameters. The sheet 52 is located against disk 15 and sheet 51 is located against the bottom of cover 25, with the tortilla ball 50 between the two sheets. Of course, the cover may be raised, by grasping the element 41, and with the cover handle 32 out of the way, as shown in FIG. 1, in order to facilitate the placement of the plastic sheets and the ball of dough. With the ball of dough in place, the cover 25 is permitted to rest upon the dough, for example in the position shown in full lines in FIG. 1 and in broken lines in FIG. 3. The arrow 53 in FIG. 3 shows the manner in which the cover can thus be raised to permit the placement of the plastic sheets and the ball 50. Of course, it will be understood that the precise starting position of cover 25 will depend upon the diameter of the ball 50.

Arrow 54 in FIG. 3 shows the manner in which the handle 32 can be oscillated; and arrow 55 in FIG. 2 shows the manner in which the disk 15 can be oscillated by movements of disk handle 23 in the direction of respective arrows 56a and 56b. After the plastic sheets and the dough ball have been placed onto the cover, as described above, the handle 32 is moved from its start position, shown in solid lines in FIG. 1 and in broken lines in FIG. 3, in the direction of arrow 56, so as to press downwardly upon the ball 50 and to press it against the disk 15. At the same time, the disk 15 is oscillated, illustratively between the two extreme positions of handle 23 shown in broken lines in FIG. 2. The two movements of the cover handle and the disk handle can readily be coordinated by the operator so that the tortilla ball 50 is rapidly reduced in height and flattened to become the flat round tortilla cake 50' shown in FIG. 3. As the handle is moved in the direction of arrow 56, the handle portion 32c engages the top of the cam 39, so as to force the cover 25 downwardly, and it will be apparent that an excellent mechanical advantage can thus be gained. The two hinge ears 35 are provided with flanges 35a which are extended from the inner edges and turned inwardly toward each other, as shown in FIG. 2. The upper edges of these flanges 35a serve together as a stop which is rigidly coupled to base top 11, and against which the element 40 strikes to and stop downward movement of cover 25. Any slight further movement of handle 32 then merely tends slightly to flatten the cam 39, as shown by a comparison of FIGS. 3 and 4. Preferably, in the stop position of cover 25, it is parallel to disk 15 so as to provide a uniform thickness of the tortilla cake 50'.

It will be apparent that the tortilla cake can thus be formed extremely rapidly, easily and with good uniformity of thickness and quality of product. The cover handle 32 can then be raised, as shown in FIG. 4. The cover 25 can then be raised, and the cake 50' can be removed and baked or otherwise treated. It will be apparent from the foregoing that the final thickness of cake 50' can be controlled by appropriate selection of the number of washers 18 which will be used.

While I have disclosed a preferred embodiment of my invention and have indicated various possible changed, omissions and additions which can be made therein, it will be apparent that various other changes, omissions and additions may be made in the invention without departing from the scope and spirit thereof.

I claim:

1. Apparatus for making tortillas comprising a base, a flat disk, means mounting said disk on said base so that said disk can be oscillated in its plane about an axis transverse thereto, a flat-bottomed cover, means pivotally mounting said cover on said base independently of the mounting of said disk so that said cover can be pivoted away from said disk to permit a ball of tortilla dough to be placed on said disk and may then be moved towards general parallelism with said disk to compress the ball between said disk and said cover and to permit flattening of the dough by simultaneous oscillation of said disk.

2. Apparatus for making tortillas comprising a base, a flat disk, means mounting said disk on said base so that said disk can be oscillated in its place about an axis transverse thereto, said mounting means including means for providing preselected variable spacing between said disk and said base, a flat-bottomed cover, means pivotally mounting said cover on said base independently of the mounting of said disk so that said cover can be pivoted away from said disk to permit a ball of tortilla dough to be placed on said disk and may then be moved towards said disk to compress the ball between said disk and said cover and to permit flattening of the dough by simultaneous oscillation of said disk, said cover and said base having cooperating means stopping movement of said cover toward said disk with said cover then parallel to said disk.

3. Apparatus for making tortillas comprising a base, a flat metal disk, means mounting said disk on said base so that said disk can be oscillated in its place about an axis transverse thereto, a flat-bottomed metal cover, a pair of flat flexible plastic sheets respectively adapted to be positioned against the facing surfaces of said cover and said disk, and means pivotally mounting said cover on said base independently of the mounting of said disk so that said cover can be pivoted away from said disk to permit a ball of tortilla dough to be placed between said plastic sheets and may then be moved towards general parallelism with said disk to compress the ball between said disk and said cover and to permit flattening of the dough by simultaneous oscillation of said disk.

4. Apparatus for making tortillas comprising a base, a flat metal disk, means mounting said disk on said base so that said disk can be oscillated in its plane about an axis transverse thereto, said mounting means including means for providing preselected variable spacing between said disk and said base, a flat-bottomed metal cover, a pair of flat flexible plastic sheets respectively adapted to be positioned against the facing surfaces of said cover and said disk, and means pivotally mounting said cover on said base independently of the mounting of said disk so that said cover can be pivoted away from said disk to permit a ball of tortilla dough to be placed between said plastic sheets and may then be moved towards general parallelism with said disk to compress the ball between said disk and said cover and to permit flattening of the dough by simultaneous oscillation of said disk.

5. Apparatus for making tortillas comprising a base having a horizontal upper surface, a flat disk, means mounting said disk on said base so that said disk is horizontal and can be oscillated about a vertical axis, a flat-bottomed cover, means mounting one side of said cover on said base independently of the mounting of said disk so that said cover overlies said base and can be pivoted about a horizontal axis towards and away from said disk, a handle, means mounting one end of said handle on said base adjacent the side of said cover opposite the cover mounting means so that said handle overlies said cover and can be pivoted about a further horizontal axis parallel to the first-mentioned horizontal axis towards and away from said cover, said handle and said cover being adapted to be raised to permit a ball of tortilla dough to be placed on said disk, said handle and said cover having cooperating means adjacent the mounted end of said handle whereby said handle when lowered engages and lowers said cover to compress the ball between said disk and said cover to permit flattening of the dough by simultaneous oscillation of said disk, and means on said base positioned and adapted to engage said cover and stop downward movement thereof when the facing surfaces of said cover and said disk are parallel to each other.

6. Apparatus for making tortillas comprising a base having a horizontal upper surface, a flat disk means mounting said disk on said base so that said disk is horizontal and can be oscillated about a vertical axis, said mounting means including means for providing preselected variable spacing between said disk and said base, a flat-bottomed cover, means mounting one side of said cover on said base independently of the mounting of said disk so that said cover overlies said base and can be pivoted about a horizontal axis towards and away from said disk, a handle, means mounting one end of said handle on said base adjacent the side of said cover opposite the cover mounting means so that said handle overlies said cover and can be pivoted about a further horizontal axis parallel to the first-mentioned horizontal axis towards and away from said cover, said handle and said cover being adapted to be raised to permit a ball of tortilla dough to be placed on said disk, said handle and said cover having cooperating means adjacent the mounted end of said handle whereby said handle when lowered engages and lowers said cover to compress the ball between said disk and said cover and to permit flattening of the dough by simultaneous oscillation of said disk, and means on said base positioned and adapted to engage said cover and stop downward movement thereof when the facing surfaces of said cover and said disk are parallel to each other.

7. Apparatus for making tortillas comprising a base having a horizontal upper surface, a flat metal disk, means mounting said disk on said base so that said disk is horizontal and can be oscillated about a vertical axis, a flat-bottomed metal cover, a pair of flat flexible plastic sheets respectively adapted to be positioned against the facing surfaces of said cover and said disk, means mounting one side of said cover on said base independently of the mounting of said disk so that said cover overlies said base and can be pivoted about a horizontal axis towards and away from said disk, a handle, means mounting one end of said handle on said base adjacent to the side of said cover opposite the cover mounting means so that said handle overlies said cover and can be pivoted about a further horizontal axis parallel to the first-mentioned horizontal axis towards and away from said cover, said handle and said cover being adapted to be raised to permit a ball of tortilla dough to be placed between said plastic sheets, said handle and said cover having cooperating means adjacent the mounted end of said handle whereby said handle when lowered engages and lowers said cover to compress the ball between said disk and said cover and to permit flattening of the dough by simultaneous oscillation of said disk, and means on said base positioned and adapted to engage said cover and stop downward movement thereof when the facing surfaces of said cover and said disk are parallel to each other.

8. Apparatus according to claim 7, said means mounting said disk on said base including means for providing preselected variable spacing between said disk and said base.

9. Apparatus according to claim 7, said means mounting said disk on said base comprising a socket mounted on said base and extending below said base and opening upwardly through said base, a spindle depending from said disk and turnably received within said socket, said spindle and said socket having closed bottoms, and a plurality of washers adapted to be positioned within said socket resting upon its bottom, said spindle bottom resting upon the uppermost of said washers, whereby the number of washers disposed within the socket determine the height of said disk relative to said base.

(References on following page)

References Cited

UNITED STATES PATENTS

| | | | |
|---|---|---|---|
| 1,527,671 | 2/1925 | Condyles | 107—49 X |
| 1,621,896 | 3/1927 | Peguero | 107—15 |
| 1,724,816 | 8/1929 | Aeschbach | 107—9 |
| 2,797,651 | 7/1957 | Iruegas | 107—49 X |
| 2,837,761 | 6/1958 | Stiegler | 17—32 |
| 2,896,555 | 7/1959 | Marcus et al. | 107—15 |
| 3,190,758 | 6/1965 | Hauf | 107—15 X |

WALTER A. SCHEEL, *Primary Examiner.*

A. O. HENDERSON, *Assistant Examiner.*